(12) United States Patent
Donath et al.

(10) Patent No.: US 7,072,764 B2
(45) Date of Patent: Jul. 4, 2006

(54) REAL TIME HIGH ACCURACY GEOSPATIAL DATABASE FOR ONBOARD INTELLIGENT VEHICLE APPLICATIONS

(75) Inventors: Max Donath, St. Louis Park, MN (US); Bryan Newstrom, Circle Pines, MN (US); Craig R. Shankwitz, Minneapolis, MN (US); Alec Gorjestani, Minneapolis, MN (US); Heonmin Lim, Sammamish, WA (US); Lee Alexander, Woodbury, MN (US)

(73) Assignee: University of Minnesota, Minneapolis, MN (US)

( * ) Notice: Subject to any disclaimer, the term of this patent is extended or adjusted under 35 U.S.C. 154(b) by 306 days.

(21) Appl. No.: 10/091,182

(22) Filed: Mar. 5, 2002

(65) Prior Publication Data
US 2002/0184236 A1 Dec. 5, 2002

Related U.S. Application Data (63) Continuation of application No. 09/968,724, filed on Oct. 1, 2001, and a continuation of application No. 09/618,613, filed on Jul. 18, 2000.
(60) Provisional application No. 60/306,248, filed on Jul. 18, 2001, provisional application No. 60/297,894, filed on Jun. 13, 2001, and provisional application No. 60/273,419, filed on Mar. 5, 2001.

(51) Int. Cl.
*G06K 9/00* (2006.01)

(52) U.S. Cl. .................. 701/200; 701/208; 701/211; 340/990; 340/993; 340/995.1; 340/995.12; 340/995.18

(58) Field of Classification Search ............ 701/200, 701/201, 202, 208, 210, 211; 340/988, 990, 340/993, 995.1, 995.12, 995.14, 995.17, 340/995.18, 995.19, 995.26, 995.27
See application file for complete search history.

(56) References Cited

U.S. PATENT DOCUMENTS

| 4,120,566 A | 10/1978 | Sanci et al. ............. 350/302 |
| 5,214,757 A | 5/1993 | Mauney et al. .......... 395/161 |
| 5,231,379 A | 7/1993 | Wood et al. ............. 340/705 |

(Continued)

FOREIGN PATENT DOCUMENTS

| EP | 1 096 229 A1 | 3/2000 |
| WO | WO 01/11388 A1 | 2/2001 |

OTHER PUBLICATIONS

Singh, D. et al., "Autonomous Vehicle using WADGPS", Proceedings of the Intelligent Vehicles '95 Symposium, Sep. 25–26, 1995, p. 370–375.*
Course Notes, "Programming With OpenGL: Advanced Techniques" ACM SIGGRAPH 1997 pp 1–3, 83–102.*

(Continued)

*Primary Examiner*—Michael J. Zanelli
*Assistant Examiner*—Eric M. Gibson
(74) *Attorney, Agent, or Firm*—Westman, Champlin & Kelly (57) ABSTRACT

A geospatial database management system is mounted on a host vehicle and manages geospatial data relating to a travel path for the host vehicle, the travel path having one or more lanes. A geospatial database stores data elements indicative of objects and a location of the objects in three-dimensional space. The objects have a lane-level resolution and the location is accurate to within an order of one decimeter or better. A database manager component is configured to maintain the data elements in the geospatial database and receive database queries from a driver assist subsystem configured to assist a driver of the host vehicle. A query processor is coupled to the database manager component and to the geospatial database and is configured to receive the database query from the database manager component. The query processor queries the geospatial database and returns query results to the database manager component. This can be done in real time.

44 Claims, 6 Drawing Sheets

U.S. PATENT DOCUMENTS

| | | | | |
|---|---|---|---|---|
| 5,291,338 A | | 3/1994 | Bezard et al. | 359/859 |
| 5,381,338 A | * | 1/1995 | Wysocki et al. | 701/207 |
| 5,414,439 A | | 5/1995 | Groves et al. | 345/7 |
| 5,497,271 A | * | 3/1996 | Mulvanny et al. | 359/631 |
| 5,499,325 A | * | 3/1996 | Dugan, Jr. | 345/594 |
| 5,517,419 A | * | 5/1996 | Lanckton et al. | 701/216 |
| 5,543,789 A | | 8/1996 | Behr et al. | 340/995 |
| 5,734,358 A | | 3/1998 | Sumiyoshi | 345/7 |
| 5,765,116 A | * | 6/1998 | Wilson-Jones et al. | 701/41 |
| 5,808,566 A | | 9/1998 | Behr et al. | 340/995 |
| 5,826,212 A | * | 10/1998 | Nagai | 701/208 |
| 5,848,373 A | | 12/1998 | DeLorme et al. | 701/200 |
| 5,872,526 A | | 2/1999 | Tognazzini | 340/961 |
| 5,926,117 A | * | 7/1999 | Gunji et al. | 340/988 |
| 5,949,331 A | * | 9/1999 | Schofield et al. | 340/461 |
| 5,951,620 A | | 9/1999 | Ahrens et al. | 701/200 |
| 5,953,722 A | | 9/1999 | Lampert et al. | 707/100 |
| 5,966,132 A | * | 10/1999 | Kakizawa et al. | 345/419 |
| 5,999,878 A | | 12/1999 | Hanson et al. | 710/208 |
| 6,038,496 A | * | 3/2000 | Dobler et al. | 701/3 |
| 6,038,559 A | | 3/2000 | Ashby et al. | 707/4 |
| 6,047,234 A | | 4/2000 | Cherveny et al. | 701/200 |
| 6,104,316 A | | 8/2000 | Behr et al. | 340/995 |
| 6,107,944 A | | 8/2000 | Behr et al. | 340/995 |
| 6,122,593 A | | 9/2000 | Friederich et al. | 701/202 |
| 6,144,335 A | * | 11/2000 | Rogers et al. | 342/357.03 |
| 6,157,342 A | * | 12/2000 | Okude et al. | 342/357.13 |
| 6,161,071 A | | 12/2000 | Shuman et al. | 701/48 |
| 6,166,698 A | | 12/2000 | Turnbull et al. | 343/713 |
| 6,184,823 B1 | | 2/2001 | Smith et al. | 342/357.13 |
| 6,188,957 B1 | | 2/2001 | Bechtolsheim et al. | 701/209 |
| 6,192,314 B1 | | 2/2001 | Khavakh et al. | 701/209 |
| 6,208,934 B1 | | 3/2001 | Bechtolsheim et al. | 701/209 |
| 6,212,474 B1 | | 4/2001 | Fowler et al. | 701/211 |
| 6,218,934 B1 | | 4/2001 | Regan | 340/438 |
| 6,226,389 B1 | | 5/2001 | Lemelson et al. | 382/104 |
| 6,249,742 B1 | | 6/2001 | Friedrich et al. | 701/202 |
| 6,253,151 B1 | | 6/2001 | Ohler et al. | 701/208 |
| 6,272,431 B1 | | 8/2001 | Zamojdo et al. | 701/211 |
| 6,278,942 B1 | | 8/2001 | McDonough | 701/210 |
| 6,289,278 B1 | * | 9/2001 | Endo et al. | 701/208 |
| 6,298,303 B1 | | 10/2001 | Khavakh et al. | 701/209 |
| 6,308,177 B1 | | 10/2001 | Israni et al. | 707/100 |
| 6,314,365 B1 | | 11/2001 | Smith | 701/200 |
| 6,314,367 B1 | | 11/2001 | Ohler et al. | 701/208 |
| 6,361,321 B1 | * | 3/2002 | Huston et al. | 434/69 |
| 6,366,851 B1 | * | 4/2002 | Chojnacki et al. | 701/208 |
| 6,370,475 B1 | | 4/2002 | Breed et al. | 701/301 |
| 6,385,539 B1 | * | 5/2002 | Wilson et al. | 701/213 |
| 6,405,132 B1 | | 6/2002 | Breed et al. | 701/301 |
| 6,438,491 B1 | | 8/2002 | Farmer | 701/301 |
| 6,486,856 B1 | | 11/2002 | Zink | 345/7 |
| 6,526,352 B1 | | 2/2003 | Breed et al. | 701/213 |

OTHER PUBLICATIONS

Office Communication from U.S. Appl. No. 09/618,613, filed Jul. 18, 2000. Date of Office Communication Feb. 6, 2004.

Development of Driving Support System for Patrol Under Poor Visibility—Evaluation of First Pilot Model—, pp. 1–7, Nov. 19, 2003.

"See the Road Ahead," GPS—Augmented Reality Aids Drivers, Nov. 1, 2003, by: Stephen Scott–Young, GPS World (14 pages).

Office Communication dated Oct. 4, 2003 for U.S. Appl. No. 10/091,182, filed Mar. 5, 2002, for First Named Inventor Max Donath.

Course Notes, "Programming with Open GL: Advanced Techniques," $24^{th}$ International Conference on Computer Graphics and Interactive Techniques, pp. 1–3, 83–102, 1997.

* cited by examiner

REAL TIME HIGH ACCURACY GEOSPATIAL DATABASE FOR ONBOARD INTELLIGENT VEHICLE APPLICATIONS

CLAIM OF PRIORITY AND INCORPORATION BY REFERENCE

The present application is based on and claims the benefit of U.S. provisional patent application Ser. No. 60/273,419, filed Mar. 5, 2001, the content of which is hereby incorporated by reference in its entirety.

The present application also claims priority as a continuation of U.S. patent application Ser. No. 09/618,613, filed Jul. 18, 2000, entitled MOBILITY ASSIST DEVICE, the content of which is hereby incorporated by reference in its entirety.

The present application also claims priority of U.S. provisional patent application Ser. No. 60/297,894, filed Jun. 13, 2001, entitled VISION ASSIST, the content of which is hereby incorporated by reference in its entirety.

The present application also claims priority as a continuation of U.S. patent application Ser. No. 09/968,724, filed Oct. 1, 2001, entitled VIRTUAL MIRROR, the content of which is hereby incorporated by reference in its entirety.

The present application also claims priority of U.S. patent application Ser. No. 60/306,248, filed Jul. 18, 2001, entitled POPULATING GEOSPATIAL ROAD DATABASE, the content of which is hereby incorporated by reference in its entirety.

BACKGROUND OF THE INVENTION

The present invention relates to a driver assist system. More specifically, the present invention relates to a real time accessible geospatial database that can be used with driver assist subsystems.

Geographic information systems (GIS) are systems that are used to store and manipulate geographic data. GIS is primarily used for collection, analysis, and presentation of information describing the physical and logical properties of the geographic world. A system referred to as GIS-T is a subset of GIS that focuses primarily on the transportation aspects of the geographic world. There have been many products developed that provide drivers with route and navigation information. Some automobile manufacturers provide onboard navigation systems.

However, these systems are based on conventionally designed and commonly used digital maps that are navigatable road network databases, covering various geographic regions. Such maps are designed for turn-by-turn, and door-by-door route guidance which can be used in conjunction with a global positioning system (GPS) unit and a display for providing route assistance to a driver.

Such conventionally designed digital maps usually refer to digital road networks that are typically set up to do routing, geocoding, and addressing. In a road network, every intersection in a map is a node and the links are the roads connecting the nodes. There are also intermediate nodes that define link (road) geometry. These systems tend to employ a linear referencing system—that is, the location of nodes are defined relative to other nodes, and intermediate attributes are defined relative to a distance from a node (e.g., the speed limit sign is 5 miles along this specified road/link starting from this specified intersection/node).

Some existing maps have been adapted to assist onboard "intelligent" vehicle systems. For example, an autonomous van with computer controlled steering, throttle, brakes and direction indicators has been developed. The lateral guidance for the van was aided by knowledge of road curvatures stored in a digital road map database. Cameras were positioned to look at various angles away from the van. The road geometry was used to determine which camera would have the best view of the road for driving.

Another autonomous vehicle control was augmented with a digital map as well. In that instance, video cameras, ultrasonic sensors and a three-dimensional scanning laser range finder were used along with a differential GPS system to control and navigate an autonomous vehicle. A three-dimensional map was used to compensate for the inaccuracies of the DGPS system.

Similarly, digital road map databases have been used to help in collision avoidance. The map databases were used to detect when the vehicle was approaching an intersection and to provide the angles of adjoining roadways to aim radar.

Similarly, a digital railway map has been used in the field of positive train control. The map was similar to a road network database and was used to calculate braking distances and make enforcement decisions for automatic brake control of a train.

All of the above-described systems discuss the use of conventionally designed digital road maps to augment the workings of onboard vehicle systems. However, they are limited to the simple road map information in conventional digital maps, augmented with a small amount of additional information.

Existing digital road network databases, although becoming more prevalent, simply do not have adequate resolution, accuracy or access times for intelligent vehicle applications developed for real time driver assistant technologies. For example, in European and Japanese urban areas, map scales for route guidance and map matching may need to be 1:10,000, while in rural areas, the map scales may only need to be 1:50,000. The urban areas require a higher resolution since the infrastructure density is greater.

However, the map scale needed for a real time driver assist system approaches 1:1—that is, what is in the database must substantially exactly correspond to what is in the real world.

SUMMARY OF THE INVENTION

A geospatial database management system is mounted on a host vehicle and manages the geospatial data relating to vehicle travel paths having one or more lanes. A geospatial database stores data elements indicative of objects and a location of the objects in three-dimensional space. The locations in the database have a positional resolution on the order of centimeters (i.e., better than approximately one decimeter) and objects contained in the database are all at the lane-level resolution. A database manager component is configured to maintain the data elements in the geospatial database and receive database queries from a driver assist subsystem configured to assist a driver of the host vehicle. A query processor is coupled to the database manager component and to the geospatial database and is configured to receive the database query, query the geospatial database, and return query results to the database manager component.

The database manager component and the query processor are configured to return the query results in substantially real time. In addition, the geospatial database is configured with an accuracy on the order of one decimeter or better.

DETAILED DESCRIPTION OF THE PREFERRED EMBODIMENTS

Figure 1:
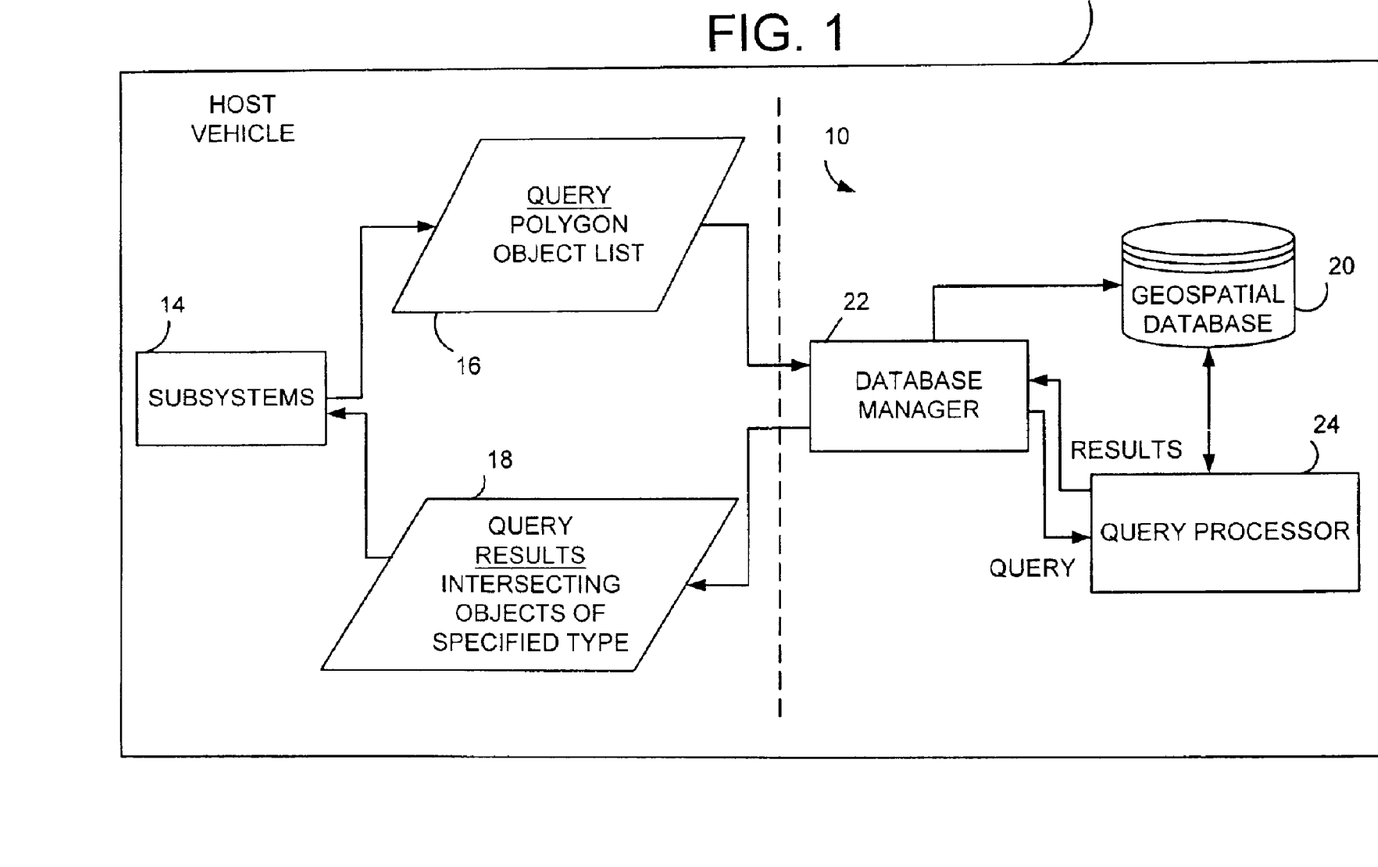
FIG. 1 is a block diagram of a geospatial database management system in accordance with one embodiment of the present invention.

FIG. 1 is a block diagram of a geospatial database management system 10 to be used on a host vehicle 12 with one or more onboard intelligent subsystems 14 (such as driver assist subsystems). Subsystems 14 illustratively assist the driver of vehicle 12 in a variety of different ways. By way of example, subsystems 14 may provide an operator interface which conveys information to the operator indicative of the position of vehicle 12 within a lane of traffic, and also indicate to the driver information about objects around the vehicle.

In order to convey that information to the user, subsystems 14 provide a query 16 to database management system 10 and receive query results 18. The query results can indicate the location of a wide variety of objects relative to vehicle 12.

While the present invention does not depend on the particular type of subsystem 14 being used, a number of those subsystems will now be described in a bit greater detail to enhance understanding of the present invention. In one embodiment, subsystems 14 include a head-up display and radar filter that work together to create a virtual representation of the views out the windshield that allow the operator to safely maneuver the vehicle in impaired or low visibility conditions. Subsystems 14 can also include a virtual mirror or other vision assist system that creates a virtual representation of views looking in different directions from vehicle 12. Subsystems 14 also illustratively include a virtual rumble strip that provides a haptic feedback through the steering wheel, brake pedals, the seat, etc. to give the operator a sense of the vehicle position within a current lane.

The road information used by each of these subsystems is illustratively maintained in a geospatial database 20 by a database manager 22. The information is retrieved from geospatial database 20, through database manager 22, by query processor 24.

Some specific examples of subsystems 14 will now be discussed for the sake of clarity only. The head-up display is described in greater detail in U.S. patent application Ser. No. 09/618,613. Briefly, however, the head up display provides a vehicle operator with a virtual roadway view when the view of the real road is impaired or blocked. This system works by creating a computer-generated image of the current lane boundaries as seen through the windshield from the driver's eye perspective. In one embodiment, the operator looks through a combiner, which is a spherical semi-reflective semi-transmissive piece of optical ground and coated glass or optical grade plastic, that combines the computer-generated image and the actual view out the windshield. The head-up display subsystem is calibrated so that the virtual roadway overlays the real roadway.

The radar target filtering subsystem is also described in greater detail in the above-identified patent application. Briefly, however, the subsystem works in conjunction with the head-up display. Radar is mounted on vehicle 12 to detect objects in a vicinity of vehicle 12. When the radar detects an object, it passes the location of the object to the head-up display which then draws an icon to represent that object in the correct location and size to overlay the object. Due to the size of the field of view of the radar system, the radar may detect signs, trees and other objects that are either off the road surface or pose no threat of collision. To reduce the number of detected objects to display, known objects that do not pose a threat are filtered and not displayed to the driver. The objects that are filtered are usually off the road, beyond the road shoulder, in a traffic island, or in a median. Filtering is performed by comparing the location of detected objects to the road geometry in the same region. If the filter determines that the detected objected is on the roadway or shoulder, then the head-up display displays an icon to represent the detected object. Objects on the shoulder are presented within the head-up display since they may present an abandoned vehicle or other potential obstacle to the driver.

The virtual rumble strip generates haptic feedback that provides a "feel" of the road to the driver by imposing, for example, a reactive torque as a function of positional change relative to the road geometry. Thus, for example, the lane boundary can be made to feel like a virtual wall or hump, which the driver must overcome in order to change lanes. This subsystem can simulate the action of a real rumble strip. As the vehicle moves toward either lane boundary, to the left or the right of the vehicle, the steering wheel can oscillate as if the vehicle is driving over a real rumble strip. The process controlling a servo motor (that imparts the oscillation and is attached to the steering wheel shaft) first determines the lateral offset between the vehicle's position and the center of the current lane. Once the lateral offset crosses a preset limit, the motor oscillates the steering wheel. Of course, unlike a physical rumble strip, the virtual rumble strip can change the amount of "rumble" as the vehicle moves. Thus, as the operator drifts further from the center line, the virtual rumble strip may increase oscillation giving the operator a sense of which direction to steer back to the center of the lane.

The objects or data types that are used within geospatial database 20 are modeled on actual road infrastructure. Together, the different data types comprise the data model that defines the objects within the database, and how the different objects relate to one another. Since each of the different subsystems 14 require different information about the same stretch or roadway, the data model can be tailored to the particular subsystems 14.

In one illustrative embodiment, all data types are based on four basic spatial data types: point, line-string, arc-segment and polygon. The most basic spatial type is the point, and all other spatial types are comprised of points. All points include three-dimensional location data, such as either an X, Y and Z component or latitude, longitude, and elevation components. Line-strings are a list of points that represent continuous line segments, and arc-segments are line-strings that represent a section of a circle. Any arc includes a series of points that lay on a circle, with a given center point. A polygon is a closed line string with the first and last points being the same.

Direction is an important component of road information. Direction has been captured by the ordering of the points within the spatial objects. The direction of any road object is defined by the direction of traffic, and is captured by its spatial representation. In other words, the first point within the object is the first point reached while driving and the second point is the second point reached, and so on, while moving in the normal direction of traffic. This encoded order makes the direction inherent in the object and removes the need to store the direction as an attribute outside of the spatial data.

Each of the onboard subsystems 14 has specific data types that represent the data it needs. Included with each data type are attributes that identify other non-spatial properties. To simplify the objects within the database, their non-spatial attributes are illustratively specific for their spatial data type. Within geospatial database 20, all the attribute processing is done during the database creation process. If an attribute changes along a spatial object, then the original object is illustratively split into two smaller objects keeping the attributes static.

In one illustrative embodiment, included within the line-string based objects are attributes that can be used to reconstruct continuous line-string segments from its parts. Using these attributes, the original line-string can be reconstructed from the line-string segments that were split off due to attribute changes. Each new component line-string has an identification (ID) number that uniquely identifies that line-string within a unique group. All line-strings that make up a larger line-string are part of the same group. Within geospatial database 20, each line-string based object is uniquely identified by its group and ID within that group. Also included is a previous ID and a next ID that are attributes which describe how each individual line-string fits into the larger line-string, or what the next and previous line-strings are.

Figure 2:
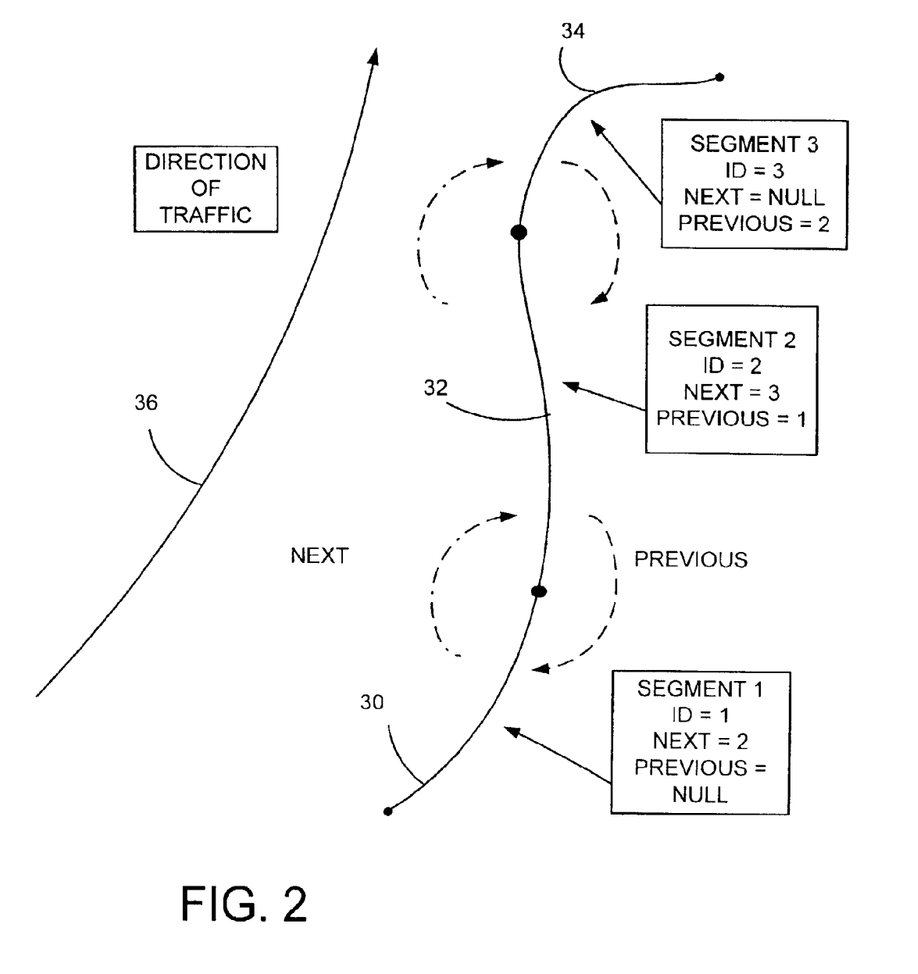
FIG. 2 illustrates how some data types are modeled in accordance with one embodiment of the present invention.

FIG. 2 is a depiction of such line-string based objects. FIG. 2 shows three line-string segments 30, 32 and 34. Such segments, when joined together as shown in FIG. 2, may illustratively represent a road boundary, center line, etc., with a direction of traffic generally indicated by arrow 36. FIG. 2 also illustrates the objects 28, 40 and 42 corresponding to segments 30, 32 and 34, with their associated attributes. The attributes, for example, include a segment number, an ID, a next line segment in the group, and a previous line segment in the group. It can thus be seen how the line segments can be reassembled to make one single line segment corresponding to the segments of a single group.

A number of specific data types will now be discussed for the previously-mentioned subsystems 14, for exemplary purposes only. It will, of course, be understood that a wide variety of other data types can be stored in geospatial database 20 as well.

The head-up display may illustratively include a LaneBoundary data type and a calibration mark (CalMark) data type. The LaneBoundaries are the left and right most limits to each individual lane and may correspond to the painted lane markings to the right and left of a lane. The head-up display projects the LaneBoundaries correctly so that they overlay the actual lane markings.

The LaneBoundary object is based on the line-string spatial data type. Each LaneBoundary is between two lanes, a lane to the right and a lane to the left, where left and right is relative to the direction of traffic. The direction property of the LaneBoundary is captured within its attributes.

Figure 3:
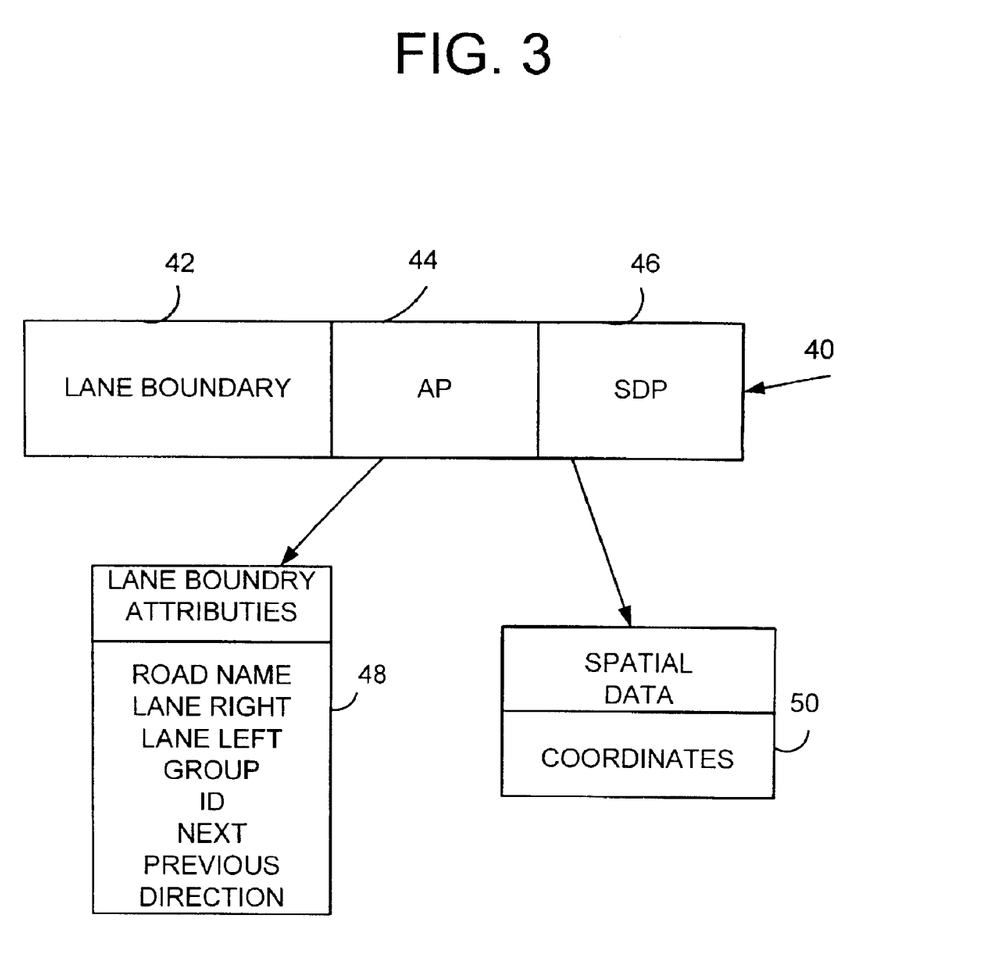
FIG. 3 illustrates one model for representing objects in the database in accordance with one embodiment of the present invention.

FIG. 3 illustrates a LaneBoundary object, and one illustrative way that it is organized within geospatial database 20. In one illustrative embodiment, the LaneBoundary object includes a first entry 40 in database 20 which has an object type identifier section 42 that identifies the object type, along with a pair of pointer sections 44 and 46. Pointer 44 illustratively contains an attributes pointer (AP) that points to a location within geospatial database 20 that contains the attributes 48 associated with the LaneBoundary object identified by identifier 42. Pointer 46 illustratively contains a spatial data pointer (SDP) that points to a location within geospatial database 20 that contains the spatial data 50 corresponding to the LaneBoundary object identified by identifier 42. The spatial data, as discussed above, will illustratively include X, Y and Z coordinates or longitude, latitude and elevation coordinates, or any other coordinates that identify the location of the particular object referred to.

The attributes 48 may also include the name and direction of the roadway of which the LaneBoundary is a part, wherein the direction attribute refers to the overall compass direction which may, for example, be included in the road name such as the "West" in "Interstate 94 West". This means that the object is found in the West bound lane or lanes of Interstate 94. Of course, it is also possible to add attributes to the object that describe the actual lane marking applied to the roadway (e.g., double line, single and skip line, yellow or white colored lines, etc.) following acceptable lane marking standards.

The head-up display subsystem 14 may also include the CalMark object that is used during calibration of the head-up display. Normally, these represent simple geometric figures painted on the roadway and are based on the line-string data type. The attributes may illustratively include a unique ID number and the name of the road with which it is associated with. The CalMark object may not be needed during operation of the system.

The radar target filtering subsystem 14 illustratively includes a RoadShoulder object and a RoadIsland object, while the virtual rumble strip subsystem 14 illustratively includes a LaneCenter object. RoadShoulders are illustratively defined as the boundary of any driveable surface which corresponds to the edge of pavement and may correspond to any painted stripes or physical barrier. The target filter uses this object to determine whether detected objects are on the road surface. RoadShoulders are based on the line-string data type and can be on one or both sides of the roadway, which is captured by an attribute. Table 1 shows the attributes of the RoadShoulder object.

TABLE 1

| RoadShoulder |
| --- |
| Road Name |
| Group |
| Id |
| Next |
| Previous |
| Direction |
| Side |

RoadIslands are areas contained within RoadShoulders, or within the roadway, that are not driveable surfaces. Once the radar target filter has determined that an object is on the road, or between the RoadShoulders, then the filter compares the location of the detected object against RoadIslands to determine whether the object is located within a RoadIsland, and can be ignored. Table 2 shows illustrative attributes of the RoadIsland object.

TABLE 2

| RoadIsland |
| --- |
| Road Name |
| Id |

LaneCenters are defined as the midpoint between the LaneBoundaries of the lane. The virtual rumble strip computes a lateral offset from the LaneCenter to be used for determining when to oscillate the steering wheel for undesired lane departure. The individual segments of a LaneCenter object can either be a straight line or a section of a circle. Each LaneCenter object captures the properties of a single lane, including direction and speed limit. Table 3 illustrates attributes of a LaneCenter object.

TABLE 3

| LaneCenter |
| --- |
| Road Name |
| Lane |
| Group |
| Id |
| Next |
| Previous |
| Direction |
| Speed |

It can be seen that, within the attributes for the LaneCenter object, there is a unique lane number that is the same number used within the LaneBoundaries, and there are also left and right attributes.

Warnings of lane departure such as the use of steering wheel vibrations or oscillations can also be determined by other more complex algorithms, such as the Time to Lane Crossing (TLC) approach, where parameters used in the algorithm are determined from the vehicle's speed, position and orientation relative to the Lane Center, or relative to the_Road shoulder, or relative to the Lane Boundaries attribute, or relative to any new attribute or one identified relative to these, and from the steering wheel or steered wheel angle.

It should also be noted that many other objects could also be used. For example, such objects can be representative of mailboxes, jersey barriers, guard rails, bridge abutments, tunnel walls, ground plane and ceiling, curbs, curb cutouts, fire hydrants, light posts, traffic signal posts, sign and sign posts and other structures adjacent to the road or pathway, as needed. Furthermore, each object may have a drawing attribute or set of attributes that describe how to draw it in a display.

Of course, it should also be noted that these data types are specific to vehicles traveling on roads. Other data types will be used in other applications such as aircraft or other vehicles traveling on an airport tarmac or in the air, vehicles travelling on or under the water, construction equipment, snowmobiles, or any of the other applications mentioned in the incorporated references.

It will be appreciated from the description of subsystems 14, that each of them needs to continually update the geospatial database information received from system 10 to accommodate vehicle motion. As vehicle 12 moves, the field of view of each subsystem 14 changes and the information previously retrieved from geospatial database 20 is no longer valid.

In database management system 10, database manager 22 and query processor 24 work together to provide access to the road information stored within geospatial database 20. Database manager 22 maintains the database and is a gateway to query processor 24.

Figure 4:
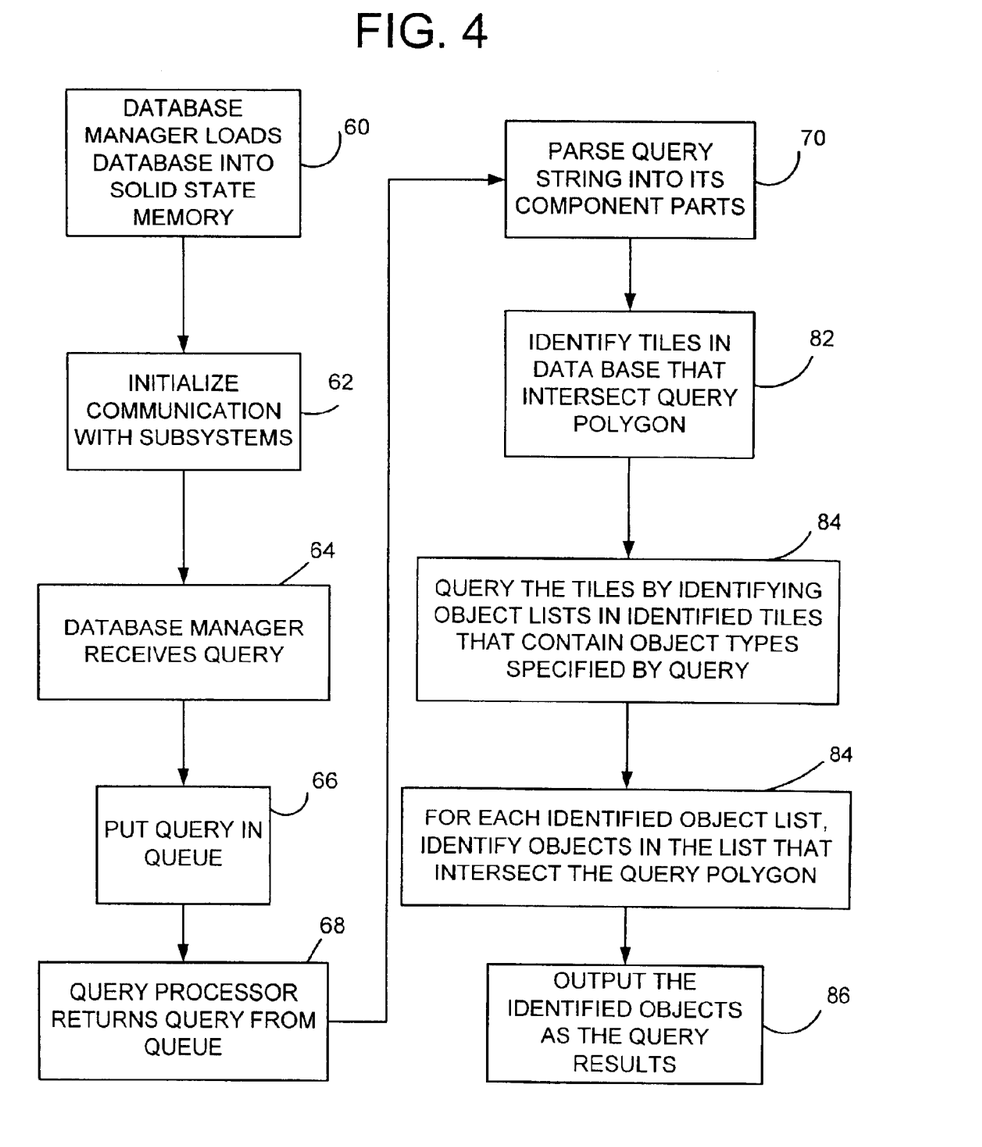
FIG. 4 is a flow diagram illustrating the operation of the system shown in FIG. 1 in accordance with one embodiment of the present invention.

FIG. 4 is a flow diagram that better illustrates the operation of the system. When database manager 22 is first initialized, it loads database 20 into solid state memory. Of course, it should be noted that, where database 20 is extremely large, database manager 22 can simply load a relevant portion of the database into solid state memory, such as a portion of the database corresponding to a 50 mile radius around a current geographic location. Loading the database into memory is indicated by block 60 in FIG. 4.

Database manager 22 then initializes communication with subsystems 14. This is indicated by block 62. Database manager 22 then simply waits for a query 16.

In generating a query 16, each of the subsystems 14 provide a predefined query structure. The query structure illustratively contains a query polygon and a character string describing the desired object types with desired attributes or attribute ranges. The query polygon is the area of interest (such as the area around or in front of vehicle 12) to the particular subsystem generating the query. Database manager 22 receives the query as indicated by block 64 and places the query in a query queue as indicated by block 66. When query processor 24 is ready to process the next query, it retrieves a query from the query queue as indicated by block 68, and parses the query into its component parts, as indicated by block 70.

Figure 5:
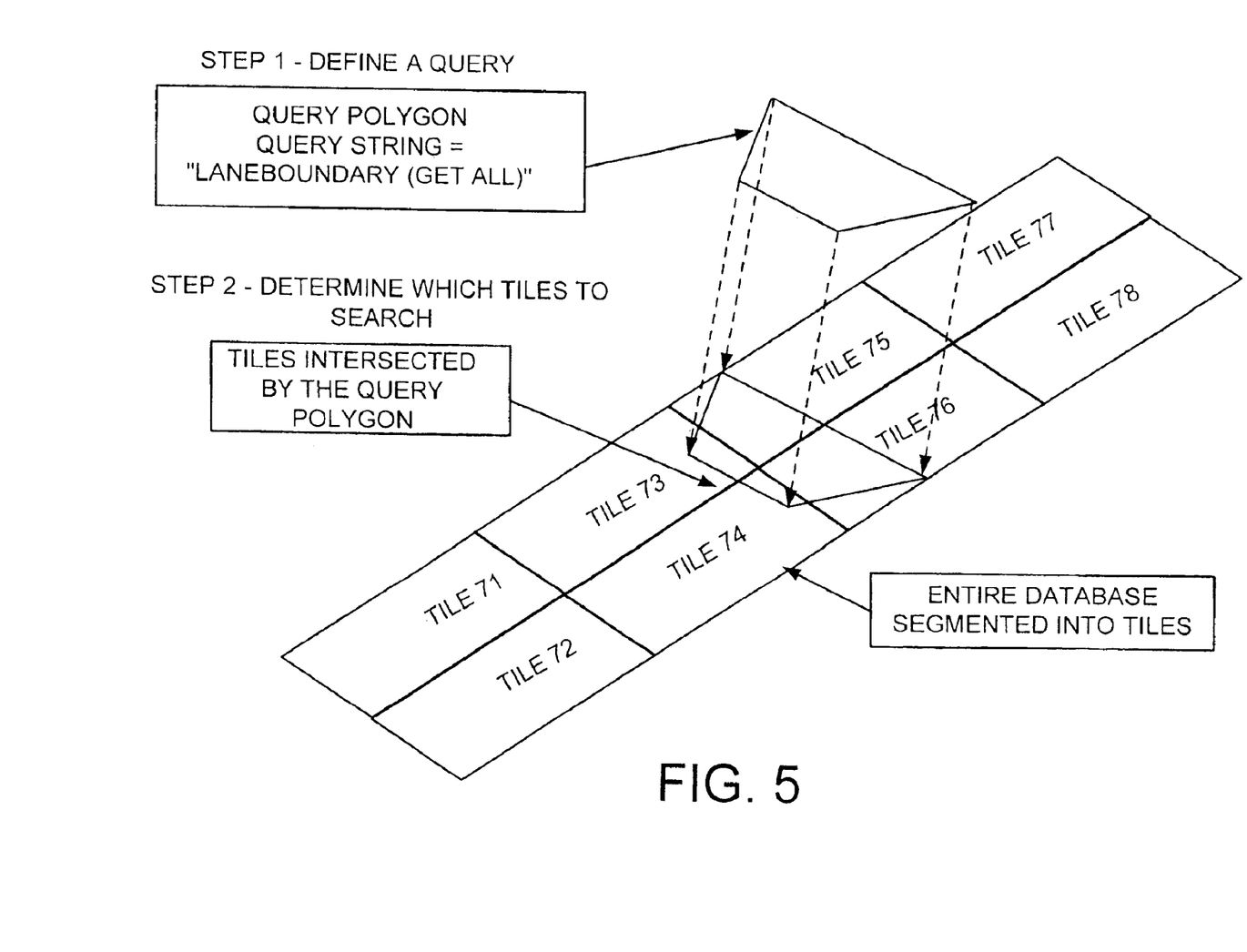
FIG. 5 illustrates the intersection of a query polygon with tiles in a database in accordance with one embodiment of the present invention.
Figure 6:
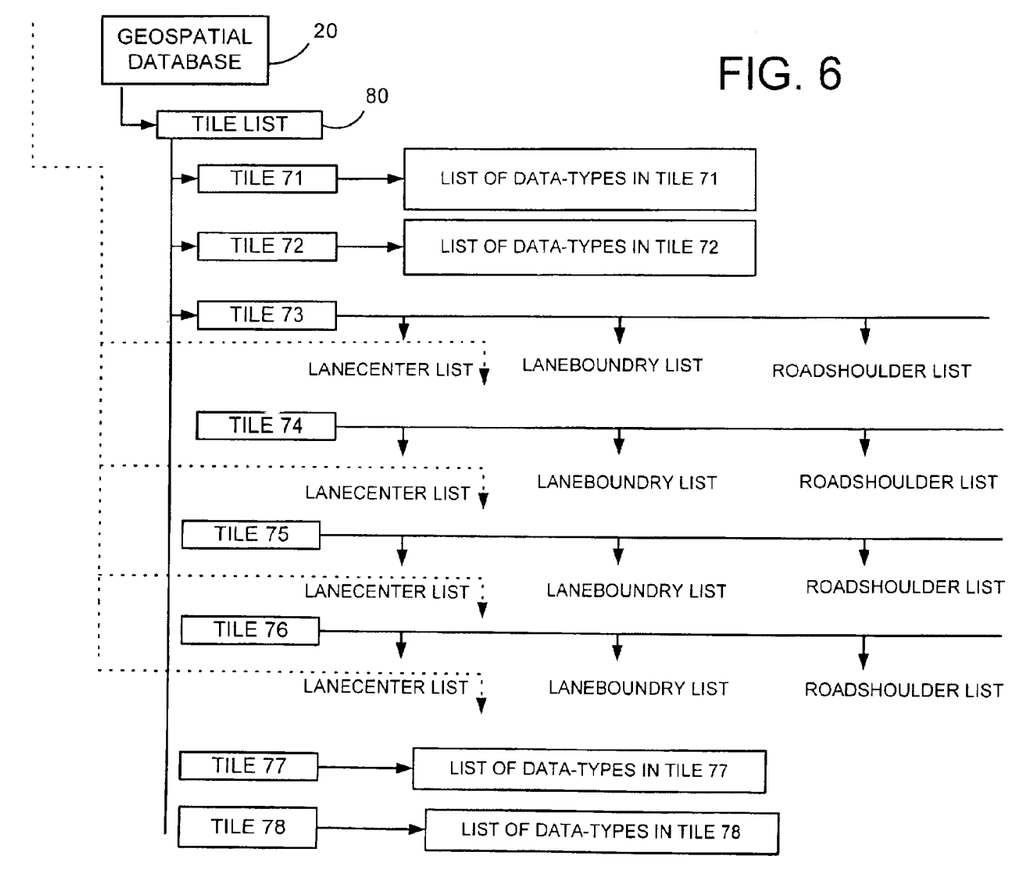
FIG. 6 illustrates searching identified tiles for specified and intersecting objects in accordance with one embodiment of the present invention.

FIG. 4 will now be described in conjunction with FIGS. 5 and 6. FIG. 5 illustrates a first portion of the query processing.

Database manager 22 maintains the database by subdividing it into tiles, or buckets, such as tiles 71–78 illustrated in FIG. 5. Of course, database 20 will illustratively be divided into a very large number of tiles and only 8 are shown in FIG. 5 for the sake of simplicity. The tiles are listed in a tile list, such as list 80 shown in FIG. 6. Tile list 80 includes a list of the tiles, and their associated spatial boundaries (the spatial or geographic area which they cover).

Within each of the tiles are separate homogeneous object lists. That is, each list within a tile only contains objects of the same object type. This is shown in FIG. 6, for example, as the LaneCenter list, the LaneBoundary list, and the RoadShoulder list for tile 3. In other words, the LaneCenter list lists all of the LaneCenter objects contained in, or intersecting, the geographic area defined by tile 3. The LaneBoundary list lists all of the LaneBoundary objects found in, or intersecting, the geographic area defined by tile 3 and so on.

When query processor 24 retrieves a query from the query queue, it examines the query polygon 81 defined by the particular subsystem 14 that generated the query. Recall that the query polygon 81 is a polygon of interest to the subsystem. Query processor 24 first examines tile list 80 to determine which of the tiles 71–78 the query polygon 81 intersects. This is indicated by block 82 in FIG. 4.

The method of determining whether the query polygon 81 intersects any of the tiles 71–78 is diagrammatically illustrated in FIG. 5 as well. FIG. 5 shows that query polygon 81 intersects tiles 73, 74, 75 and 76.

Once the intersecting tiles have been identified, query processor 24 then queries the intersecting tiles 73–76 by identifying object lists in the intersecting tiles that contain object types specified by the object list in the query 16 generated by the subsystem 14. This is indicated by block 84 in FIG. 4. In one example, query processor 24 identifies the tiles that contain desired objects by simply doing a string compare between the object list in the query 16 and the objects in the intersecting tiles.

Once query processor 24 has identified objects within an intersecting tile that meet the attributes specified in the query 16, query processor 24 then determines whether any of those specific objects intersect with the query polygon 81. This is indicated by block 86 in FIG. 4.

Having now identified particular objects which not only intersect the query polygon 81, but which are also desired object types (desired by the subsystem 14 that generated the query 16) query processor 24 tabulates the results and passes them back to database manager 22. Database manager 22, in turn, passes query results 18 back to the subsystem 14 for processing by that subsystem. This is indicated by block 86 in FIG. 4.

It can be seen that the present invention only needs to do a small number of initial intersection calculations in determining which tiles intersect the query polygon. This yields lists of objects in the same general vicinity as the query polygon. Then, by doing a simple string compare against the object lists, the present system identifies objects of interest in the same general vicinity as the query polygon before doing intersection computations on any of the individual objects. Thus, the intersection computations are only performed for objects of interest that have already been identified as being close to the query polygon. This drastically reduces the number of intersection computations which are required. This greatly enhances the processing speed used in identifying intersecting objects having desired object types.

In one illustrative embodiment, the operation of the database manager 22 and query processor 24 was programmed in the C computer language with function calls simplified by using only pointers as illustrated with respect to FIG. 3, such that no large structures or arrays are passed through the functions. The specific query processing routines are known and are taught, for example, in Computational Geometry In C, written by Joseph O'Rourke, Cambridge University Press, Second Edition, September 1998. The main processing routines are point-in-polygon and line-line intersection routines. In the routines, a line-string intersects a polygon if any of the line-string's points are contained within the polygon, or if any segment of the line-string, defined by two consecutive points, intersects any edge of the polygon. The polygon-polygon intersection is the same as a line-string-polygon intersection. An arc-segment is treated as if it were a line-string. Even though an arc-segment can be described by its radius, start and end points, within a database it is represented as having interior points for query processing.

In order to further enhance the speed of the query process, no clipping or merging is performed on the results. Objects that intersect the query polygon are returned whole. There is no attempt to return only the part of the object that is within the query polygon, or merge together similar objects.

The size of the tiles within geospatial database 20 can vary with application. In general, smaller tile sizes produce a larger number of objects, but with a smaller average number of objects per tile. Also, larger tiles have a smaller number of objects but a larger average number of objects per tile. It has been observed that, as tile size increases, query times to the database also increase. This increase in query time is due to the fact that larger tiles contain more objects and during query processing, all relevant objects must be checked against the query polygon. It is also observed that the query time begins to increase again as the tile size is reduced below approximately 1000 square meters. The increase in query time as the tile size decreases is from the overhead of handling more tiles. As the tile size decreases, the number of tiles that intersect the query polygon increases. It was observed that, for the head up display and target filter subsystems, the minimum mean query time was observed for tiles being 1000 square meters. For the virtual rumble strip, the database having tiles of 2000 square meters performed best. However, it is believed that optimum tile size in the database will be between approximately 500–6000 square meters, and may illustratively be between 500–4000 square meters and may still further be between 500–2000 square meters and may be approximately 1000 square meters to obtain a best overall performance.

It has also been observed that increasing the size of a query polygon does not significantly affect the time to process that query. Thus, as query processing needs to be reduced to free up processing time, the query polygon may be increased in size with little effect in query processing time.

It should also be noted that tile size in the present invention can be varied based on information density. In other words, in rural areas, there are very few items contained in the geospatial database, other than road boundaries and center lines. However, in urban areas, there may be a wide variety of center islands, curbs, and other objects that must be contained in the geospatial database at a greater density. In that case, the database can be tiled based on content (e.g., based on the amount of objects on the road).

It should also be noted that a known algorithm (the Douglas-Peucker Algorithm set out in D. Douglas and P. Pucker, Algorithms for the Reduction of the Number of Points Required to Represent a Digitized Line or Its Character, the Canadian Cartographer, 10(2):112–122, December 1973) was used to remove unwanted vertices from a list of points within a given tolerance.

Further, the tiles or buckets described herein are but one exemplary way to aggregate data in space. For example, a quadtree system can be used as well, which recursively subdivides space. Other known techniques can also be used.

The present database management system can return query results using real time processing. Thus, the present invention can provide an output (query results) to subsystems for collision detection and for lane-level guidance in real time. By "real time" it is meant that the query must be returned in sufficient time to adequately operate the host vehicle on which it is contained. In one illustrative embodiment, such as an automobile, real time requires query processing (i.e., returning the query results from the time the query was received) in less than 0.1 seconds (100 milliseconds) and 50 ms may be even more desirable. The present invention has been observed to return query results, at a worst case time of approximately 12 milliseconds.

It can thus be seen that present invention differs greatly from traditionally designed and commonly used digital maps. The present invention includes objects located within a geospatial database with a resolution that is at a lane level, or even sub-lane level rather than simply at a road level. The data contained in the geospatial database is also accurate to within submeter distances, such as to within approximately plus/minus 10 cm and may be within a range of approximately +/−2–10 cm. All this data can be processed in real time.

A number of additional applications for the present invention will now be described. In should be noted that besides the warning systems described below, the geospatial database can be used to implement automated collision avoidance systems as documented in the following references: M. Hennessey, C. Shankwitz and M. Donath "Sensor Based 'Virtual Bumpers' for Collision Avoidance: Configuration Issues", in Collision Avoidance and Automated Traffic Management Sensors, A. C. Chachich and M. J. de Vries, editors, Vol. 2592, pp. 48–59, Philadelphia, Pa., SPIE Proceedings, Oct., 1995. C. Shankwitz, M. Donath, V. Morellas and D. Johnson "Sensing and Control to Enhance the Safety of Heavy Vehicles", Proceedings of the Second World Congress on Intelligent Transport Systems, pp. 1051–1056 (Volume 3), Yokohama, Japan, ITS America, November 1995. W. Schiller, Y. Du, D. Krantz, C. Shankwitz and M. Donath "Vehicle Guidance Architecture for Combined Lane Tracking and Obstacle Avoidance", Chapter 7 in Artificial Intelligence and Mobile Robots: Case Studies of Successful Robot Systems". Edited by D. Kortenkamp, R. Peter Bonasso and Robin Murphy, pp. 159–192, AAAI Press/The MIT Press, Cambridge, Mass., 1998. W. Schiller, V. Morellas and M. Donath "Collision Avoidance for Highway Vehicles Using the Virtual Bumper Controller", Proceedings of the 1998 Intelligent Vehicles Conference, Stuttgart, Germany, October, 1998. A. Gorjestani and M. Donath "Longitudinal Virtual Bumper Collision Avoidance System Implemented on a Truck," Proceedings of the $6^{th}$ITS World Congress, Toronto, Canada, November, 1999. A. Gorjestani, C. Shankwitz and M. Donath, "Impedance Control for Truck Collision Avoidance," Proceedings of the American Control Conference, Chicago, Ill., June 2000.

A geospatial database that contains roadway features can be used with a vehicle location device to determine the vehicle's position with respect to the road. Based on the vehicle's location within the lane, one can generate warnings that alert the driver of a possible road/lane departure. The criteria for issuing a warning depends on the application. For example, a lane departure warning can be issued if the vehicle leaves the boundaries of the lane as determined by the lane boundaries in the geospatial database. An alternative criteria can be to only provide a warning if the vehicle is in danger of leaving the road or crossing into an opposing lane of traffic. Other roadside features such as guard rails can be embedded in the database and warnings can be given based on the proximity to these roadside features.

The warning can take many forms. Some examples can include visual (which has already been discussed in the "Mobility Assist Device" patent application, incorporated above by reference, and will not be discussed here), or audio, tactile, and haptic based warnings.

An audio warning can be given if the vehicle violates the criteria established in a position warning policy. Such a policy describes when and how warnings are communicated to the driver. The warning policy, or algorithm, is one that can be developed, for example, by human factors' scientists. The warning may be as simple as a tone or as complex as synthesized speech. Stereo audio can be used to more intuitively communicate a position-centered warning to the driver. For example, a lane departure to the right of the lane boundary in the road database can induce a warning generated in the right side speaker(s) in the vehicle. Similarly, a departure to the left can generate an audible warning from the left side speaker(s). The volume and type of warning can also be manipulated based on the severity of the departure or the severity of the consequences of the departure.

A tactile warning can be given if the vehicle violates the criteria established in the position warning policy. Vibration through the seat is one such example of a tactile warning. A departure to the left can invoke a left side warning and the left side of the seat can be vibrated to quickly communicate the departure location to the driver. Similarly, a departure to the right can invoke a right side vibration of the seat. Again, the amplitude and frequency of the seat vibration can be dynamically altered based on the nature of the departure.

Haptic feedback is a system that warns the driver through the hands or feet (or other human-machine interface point) that the vehicle is moving into a position on the road which is not permissible or "dangerous". Moving out of one's lane can cause the steering wheel to provide resistive torque, not unlike trying to steer over a bump. That resistive torque disappears after the vehicle has moved fully into the adjacent lane, if that adjacent lane is safe (i.e. no other vehicle is present and the lane allows vehicles to pass, or the lane is legitimately marked for driving in the same direction). More information on haptic feedback is provided below.

An object detection sensor mounted on the vehicle and a safety policy can be used to generate warnings to the driver. An array of object detection sensors can also be employed such that the coverage area surrounds the vehicle. In such a system, a warning can be issued when vehicles encroach upon a programmable 'virtual boundary' surrounding the host vehicle (the one carrying the driver). The virtual boundary can be dynamic and related to the road geometry in the map database. The warning can be proportional to the level and location of the encroachment by the other vehicles or objects into the host vehicle's virtual boundary. For example, it may change its shape with road curvature or as the vehicle enters an intersection. The warnings can take several forms and can be combined with the position warnings discussed above. For example, a departure from the current driving lane may be tolerated if the adjacent lane is a valid lane and no other vehicles are detected in the area that the vehicle performing the lane departure is attempting to occupy. However, if the object detection device detects a vehicle in the adjacent lane according to the map database, a warning can be issued. A different warning or different intensity warning can be given based on the location of surrounding vehicles in the road map database.

An audio warning can be given to the driver if another vehicle penetrates the virtual boundary of the host vehicle. With stereo audio, the warning can be given on the side that the incursion takes place. For example, a target vehicle that encroaches on the left side virtual boundary can impart a warning to the left side speaker(s). Similarly, a target vehicle that encroaches on the right side virtual boundary can produce a warning to the right side speaker(s). If more channels of audio are present, a warning can be given to the speaker closest to the incursion. The warning sound can vary in frequency and amplitude depending on the severity of the incursion. A virtual sound source can be located anywhere within 360 degrees of the driver. A warning message can also be different based upon different situations, local road characteristics and the severity of the incursion.

A tactile warning can be given to the driver if another vehicle penetrates the virtual boundary of the host vehicle. A seat vibration may be used to alert the driver to a target vehicle within the virtual boundary of the host vehicle. For example, a vehicle penetrating the right side virtual boundary can produce a vibration in the right side of the seat. Similarly, an incursion into the left side of the virtual boundary can produce a vibration in the left side of the seat. The frequency and amplitude of the warning can be related to the severity of the encroachment.

A haptic warning can be given to the driver if another vehicle encroaches into the virtual boundary of the host vehicle. The feedback can be through the steering wheel, accelerator pedal and/or brake pedal. For example, an incursion into the right side virtual boundary can cause the object warning system to induce a torque to the steering wheel that alerts the driver of the incursion. If the incursion was to take place in front of the vehicle, feedback to the pedals can alert the driver that the headway to the lead vehicle is insufficient. The pedal feedback can be as simple as a pulse, or a more complicated dynamically changing force, related to the target vehicle's position, velocity and acceleration with respect to the host vehicle and the geospatial database. More on haptic interfaces is described below.

A geospatial database can include a high degree of detail related to the layout of the roadway and the surrounding "road furniture". These details can be used to enhance a driver assistive haptic warning system in several ways. As discussed above, one set of data that can be included in the geospatial database of the present invention is the accurate location of the center of the driving lanes. The distance from the center of the vehicle to the center of the driving lane can be used to trigger various types of warnings.

Visual, auditory, tactile, and haptic feedback that are used to provide warnings about vehicle position or about other objects in front of the vehicle have been discussed above. Different forms of haptic feedback will now be discussed.

When the vehicle position exceeds a certain predetermined distance from the center of the lane, an actuator in the steering system is energized to shake the wheel in a manner that simulates the feeling of driving over a rumble strip in the pavement. This "virtual rumble strip" can be programmed to give the steering wheel a gentle push in the direction required to return to the center of the lane. This "push" can take several forms, one of which is a vibrational pattern having an amplitude and frequency that may shift to the right and left as needed. The distance to the center of the lane can also be used to trigger vibrations in the seat (right or left vibrator) and auditory warnings through the vehicle's sound system.

Such haptic systems can be designed to be used in conjunction with the geospatial database of the present invention in order to take advantage of information included therein. For example, if the constantly active real time queries to the geospatial database show that there is an adequate shoulder along the side of the road, then the haptic system can give a less intense warning regarding a potential lane departure in that direction than if the query showed that there is no shoulder. The feedback through the steering wheel can also be programmed to react differently if the vehicle is moving into a lane of oncoming traffic than if the adjacent lane is part of a multi-lane roadway where all traffic is moving in the same direction as the host vehicle.

In the low visibility conditions in which snowplows typically operate, a geospatial database includes the locations of guardrails, signposts and other roadway hardware. The haptic advisory subsystem can then be used (in addition to or instead of a HUD) to help the snowplow operator avoid contact with them thereby avoiding crashes and expensive repairs in the spring. For all of the these specific warnings, it is necessary to have an accurate, high resolution geospatial database that has much more detail than a typical road network database of the type used for route planning.

Haptic feedback based on information in a geospatial database can be added to the throttle and brake pedals as well as the steering wheel. The throttle pedal can be programmed to push back against the driver's foot when a vehicle is approaching an intersection or some other fixed obstacle during a snowstorm or in heavy fog. In an embodiment in which the database contains the location of stop signs at rural intersections, then the braking system can force the vehicle to stop especially if there is reason to suspect that the driver is in some way impaired.

A haptic system can integrate control of the steering, braking, and throttle so that a driver may not steer into a road or lane that only allows traffic in the opposite direction. This is an important feature that would prevent senile drivers or drivers under the influence, for example, from entering and driving in the wrong direction down a road or lane. Similarly, if the vehicle is already pointing in the wrong direction, the system can provide an accelerator pedal resistance until the vehicle is steered out of that direction.

Another application for a haptic steering interface combined with a geospatial database is to help a transit bus driver stay within the boundaries of a narrow bus rapid transit (BRT) lane or within a narrow tunnel lane. During rush hour traffic in certain cities, buses are allowed to use the shoulder of the road to bypass stopped traffic. Since these shoulders are not designed to carry moving traffic, they are not as wide as a standard traffic lane. It can be quite a challenge to maneuver a bus along one of these lanes since the lanes are only a few inches wider than the bus. This task is particularly difficult in inclement weather if the outside edge of the shoulder is covered with snow so the driver cannot see exactly where the edge is. A geospatial database of the present invention can include the precise location of both sides of the BRT lane and a haptic steering system can use that information to assist the driver with centering the vehicle. One technique to use in this situation is to implement a virtual potential field where the system adds a torque to the steering system that will tend to return the vehicle to the proper centered location in the BRT lane. The steering torque is programmed to make the bus feel like it is being driven in a lane with an inverted crown so that it requires a definite effort to steer the bus "up" and out of its proper location in the center of the lane. The width and slope of this virtual potential field can be changed to suit the conditions dictated by information in the geospatial database. Due to congestion, there is more political pressure to squeeze in an additional lane into a tunnel. This can typically only be done by narrowing the lanes, including one explicitly marked for buses only. The Lincoln Tunnel in New York City is one such example. The haptic feedback developed for a narrow bus only shoulder can also be used for narrow tunnel lanes.

The database of the present invention allows the system to know where all the road features of the roadway are located, in real time. This information can be used to improve the signal-to-noise ratio of range sensors. A vehicle location device (e.g. GPS) provides the host vehicle with information as to its location and heading in a global coordinate system. The road database can be queried to provide all the road features (lanes, road boundaries, signs, traffic islands, etc.) surrounding the host vehicle. Range sensors (such as radar) provide the location of objects surrounding the vehicle in some vehicle based local reference frame. The objects detected by the range sensor can be placed in a global reference frame in their proper location on the road using the location device and the high accuracy database. The range sensor returns can then be filtered based on the user's criteria. For example, objects outside the road (i.e. outside the driveable surface) can be filtered if so desired. Any range sensor return outside the roadway as determined by comparison with the road database can be removed from the detected object pool. The criteria for filtering can be based on any map database road feature. Multiple road features can be employed to determine the filtering criteria. An advanced range sensor filter as described above can drastically reduce unwanted range sensor returns that may produce false warnings to the driver when used with an object warning device (audio, haptic, tactile, visual, etc.).

There has been a significant amount of research into assessing the performance of a driver by monitoring his or her control inputs and lane keeping ability. Various researchers have found a positive correlation between erratic control inputs and fatigue, but there are other reasons for erratic driving than lack of sleep or driver impairment. Lateral offsets may be due to road curvature rather than driver error. The condition of the road can also cause a driver to do what might look like a poor job of lane keeping while he or she might actually be just dodging potholes. A geospatial database according to one embodiment of the present invention can contain reasonably up-to-date information on road conditions to help a performance monitoring system decide whether it is the driver or the road that needs to be 'rejuvenated'.

If a driver performance monitoring system detects a drowsy or otherwise impaired driver there is the question of what to do with that information. It has been found that simply sounding a warning to the driver is not usually enough. The sleepy driver will sometimes incorporate the warning into a dream, ignore alarms and continue driving in a sleepy stupor. A backup system that will take over for the driver when it determines that the human driver is driving inappropriately (due to driver impairment, intoxication, driving under the influence of various substances, etc.) automatically steers the vehicle until it can safely take the vehicle off the road and park it on a safe spot on the shoulder of the road. Once again a detailed geospatial database of the road is necessary to determine if there is a shoulder at the current location, or up ahead, and whether it is wide enough to park safely.

Inappropriate driver behavior can be determined by several means including steering wheel behavior (angular velocity and displacement characteristics), and lateral and longitudinal vehicle behavior. Information from the geospatial database and from a normative driving pattern stored in a "smart card"-based driver's license, ensures that this determination has very few false positives. The driver's unique normal driving behavior can be captured parametrically on this smart card license that must be inserted into the vehicle's control interface in order to allow the vehicle to start. Once those parameters identifying that driver's "normal" parameters are integrated with local geometrical parameters (based on the local features from the geospatial database), one can determine whether the driver is impaired, and then carry out the tasks programmed to take place when the driver is determined to be driving in an impaired fashion.

The database in accordance with one embodiment of the present invention facilitates the use of a virtual bumper for automated collision avoidance maneuvers. The virtual bumper combines longitudinal and lateral collision avoidance capabilities to control a vehicle under normal and emergency situations. A programmable boundary defines a "personal space" around the "host" vehicle. Incursions by "target" vehicles or other objects into this space are sensed by range sensors mounted on the host vehicle. The geospatial database makes it possible to get reliable range and range derivative values. Otherwise, spurious signals can cause the vehicle to maneuver around falsely sensed targets continuously and therefore make this implementation very difficult.

This virtual deflection of the bumper defined by the boundary generates a virtual "force" on the host which affects its trajectory in a manner that attempts to avoid (or at least mitigate) collisions. The relationship between the virtual bumper deflection and the virtual force that is applied to the host vehicle is computed based on a non-linear relationship which is a function of the range and the derivative of range to the objects in the host vehicle's environment. The road (defined in the geospatial database) also induces a virtual force, which attempts to keep the host within its lane of travel.

The virtual bumper includes three main subsystems. The longitudinal control subsystem incorporates impedance control to adjust the headway to vehicles up ahead and maintains the desired traveling speed when no obstacles are present. The lateral control subsystem is an impedance controller that maintains the host vehicle's position in the lane and performs collision avoidance in the side regions of the vehicle. The final component of the virtual bumper is the lane change subsystem, which determines the safest lane of travel based on the road environment and issues lateral position commands that perform lane changes (or direct the vehicle off the road if needed). Again, the lanes of travel are defined in the geospatial database. Host vehicle velocity and acceleration is measured using a Differential Global Position System (DGPS) and then used in the collision avoidance controllers.

Two virtual force types are defined within the longitudinal controller that are designed to provide a comfortable response for differing degrees of control action. The 'linear' and 'non-linear' forces are named based on their intended response in the range vs. range rate phase plot. The phase plot is formed by placing the measured range (provided by the range sensors) on the x-axis and the range rate (relative velocity) on the y-axis. This phase plot is useful for designing headway controllers because it graphically presents the spacing relationship between the host and target vehicles.

A linear force is applied to the vehicle when low levels of deceleration are required and tends to force the target vehicle's state (range, range rate) toward a linear trajectory in the range-range rate phase plane moving down to the final desired headway. This headway is calculated from a user selected headway time so that it scales with the host vehicle's velocity. The linear force is determined by the impedance of the virtual bumper. The impedance field's spring coefficient and damping coefficient are determined using pole placement techniques and are tuned in software to provide a second order over-damped response.

A non-linear force is applied to the vehicle when higher deceleration is needed to slow down the host vehicle. In order to achieve comfortable braking, a constant deceleration is used, which forms a parabolic trajectory in the range vs. range rate phase plot. A line of constant deceleration based on experiments performed at low levels of braking, is used to switch between the application of nonlinear and linear forces. Any target state below this switching line and within the personal space boundary will be acted upon by the non-linear forces. Similarly, any target state above this switching line will be acted upon by the linear forces. The non-linear forces tend to adjust the host vehicle's velocity/acceleration so that the target state (measured by the range sensors) forms a parabolic trajectory in this phase plane.

Although the present invention has been described with reference to preferred embodiments, workers skilled in the art will recognize that changes may be made in form and detail without departing from the spirit and scope of the invention.

What is claimed is:

1. A geospatial database management system (GDMS), mounted on a host vehicle, managing geospatial data relating to travel paths having one or more lanes, comprising:
   a geospatial database storing data elements indicative of objects and a location of the objects in three dimensional space, the objects having a lane-level resolution and the location having an accuracy of approximately one decimeter or less;
   a database manager component configured to maintain the data elements in the geospatial database and receive database queries from a driver assist subsystem configured to assist a driver of the host vehicle based on the data elements stored in the geospatial database; and
   a query processor coupled to the database manager component and the geospatial database and configured to receive the database queries from the database manager component, query the geospatial database based on the database queries and return query results to the database manager component.

2. The GDMS of claim 1 wherein the database manager component and the query processor are configured to return the query results in substantially real time.

3. The GDMS of claim 2 wherein the database manager component and the query processor are configured to return the query results within approximately 100 milliseconds (ms) of receiving the database query from the driver assist subsystem.

4. The GDMS of claim 3 wherein the database manager component and the query processor are configured to return the query results within approximately 50 ms of receiving the database query from the driver assist subsystem.

5. The GDMS of claim 3 wherein the database manager component and the query processor are configured to return the query results within approximately 12 ms of receiving the database query from the driver assist subsystem.

6. The GDMS of claim 3 wherein the location of the objects in the geospatial database is accurate to within less than one decimeter.

7. The GDMS of claim 6 wherein the location of the objects in the geospatial database is accurate to within less than approximately +/− 0.1 meters.

8. The GDMS of claim 7 wherein the location of the objects in the geospatial database is accurate to within a range of approximately +/− 2–10 centimeters.

9. The GDMS of claim 1 wherein the database query from the driver assist subsystem includes a query polygon indicative of a geospatial region of interest and wherein the query processor is configured to identify data elements in the geospatial database that have a location that intersects with the query polygon.

10. The GDMS of claim 9 wherein the database manager component maintains the geospatial database according to tiles, each tile corresponding to a predetermined geospatial region, each tile including one or more corresponding data element lists, each data element list listing data elements of a specified element type that intersect with the corresponding tile.

11. The GDMS of claim 10 wherein the query processor is configured to identify data elements in the geospatial database that have a location that intersects with the query polygon by identifying tiles as intersecting tiles if they intersect with the query polygon.

12. The GDMS of claim 11 wherein the database query includes a data element indicator indicating relevant data element types that are relevant to the database query, and wherein the query processor is configured to search the data element lists in the intersecting tiles to identify relevant data element lists that contain data elements having the relevant data element types.

13. The GDMS of claim 12 wherein the query processor is configured to identify data elements in the geospatial database that have a location that intersects with the query polygon by identifying data elements in the relevant data element lists that intersect with the query polygon.

14. The GDMS of claim 1 wherein the database manager component is configured to maintain the data elements in the geospatial database as data objects having an attribute portion and a spatial data portion, the attribute portion including attributes indicative of the data object and the spatial data portion including data indicative of the location of the object in three dimensional space.

15. The GDMS of claim 14 wherein the data objects include a LaneBoundary object representative of a roadway lane boundary.

16. The GDMS of claim 14 wherein the data objects include a RoadShoulder object representative of a roadway shoulder.

17. The GDMS of claim 14 wherein the data objects include a RoadIsland object representative of a roadway island.

18. The GDMS of claim 14 wherein the data objects include a LaneCenter object representative of a roadway lane center.

19. The GDMS of claim 14 wherein the data objects are configured based on requirements of the driver assist subsystem.

20. The GDMS of claim 14 wherein the attributes are indicative of how to draw the data object on a display.

21. The GDMS of claim 14 wherein the data objects include objects representative of structures adjacent to the travel paths.

22. The GDMS of claim 21 wherein the data objects are representative of one or more of mailboxes, jersey barriers, guard rails, bridge abutments, tunnel walls, ground plane and ceiling, curbs, curb cutouts, fire hydrants, light posts, traffic signal posts, sign and sign posts.

23. The system of claim 1, wherein the driver assist subsystem includes a head-up display that generates an image of boundaries of the lanes of the travel paths.

24. The system of claim 23, wherein the head-up display is positioned in the host vehicle such that the boundaries of the image substantially overlay actual lane boundaries of the travel paths when viewed by the driver of the host vehicle.

25. The system of claim 24, including a radar subsystem configured to detect objects in a vicinity of the host vehicle and pass a location of the detected objects to the head-up display which modifies the image to include a graphical representation of the detected objects that substantially overlay the detected objects when viewed by the driver of the host vehicle.

26. The system of claim 25, including a radar filtering subsystem that blocks the passage of the location of selected objects, detected by the radar subsystem, to the head-up display.

27. The system of claim 1, wherein the driver assist subsystem generates haptic feedback to the driver of the host vehicle.

28. The system of claim 27, wherein the haptic feedback is generated in response to a position of the host vehicle relative to the location of the objects corresponding to the data elements stored in the geospatial database.

29. The system of claim 27, wherein the haptic feedback is generated through a steering wheel, a brake pedal, or a seat.

30. The system of claim 27, wherein the driver assist subsystem is a virtual rumble strip.

31. The system of claim 27, wherein the haptic feedback includes at least one stimulus applied to the driver of the host vehicle.

32. The system of claim 31, wherein the stimulus includes at least one of a vibration, a force, a torque, and a motion.

33. The system of claim 1, wherein the driver assist subsystem generates a warning based on a position of the host vehicle relative to the location of the objects corresponding to the data elements stored in the geospatial database.

34. The system of claim 33, wherein the warning is at least one of a visual warning, an audio warning, a tactile warning, and a haptic warning.

35. The system of claim 1, including a radar subsystem configured to detect objects in a vicinity of the host vehicle and pass a location of the detected objects to the driver assist subsystem.

36. A geospatial database management system (GDMS) for use on a host vehicle with a driver assist subsystem, comprising:
    a geospatial database storing objects having attributes indicative of items relating to a travel path for the host vehicle and a location of the items in a coordinate system, the objects being stored with lane-level resolution sufficient to distinguish among different lanes in the travel path; and
    a database accessing system configured to access the objects in the geospatial database, in response to a query from the driver assist subsystem, in substantially real time.

37. The GDMS of claim 36 wherein the database accessing system is configured to return query results within approximately 100 milliseconds (ms) of receiving the query from the driver assist subsystem.

38. The GDMS of claim 37 wherein the database accessing system is configured to return the query results within approximately 50 ms of receiving the query from the driver assist subsystem.

39. The GDMS of claim 38 wherein the database accessing system is configured to return the query results within approximately 12 ms of receiving the query from the driver assist subsystem.

40. A geospatial database management system (GDMS) for use on a host vehicle with a driver assist subsystem, comprising:
    a geospatial database storing objects having attributes indicative of items relating to a travel path for the host vehicle and a location of the items in a coordinate system, the location being accurate to within approximately 1 decimeter; and
    a database accessing system configured to access the objects in the geospatial database, in response to a query from the driver assist subsystem, in substantially real time.

41. The GDMS of claim 40 wherein the geospatial database stores the objects with lane-level resolution sufficient to distinguish among different lanes in the travel path.

42. The GDMS of claim 40 wherein the location is accurate to within approximately +/− 0.1 meters.

43. The GDMS of claim 42 wherein the location is accurate to within a range of approximately +/− 2–10 centimeters.

44. A geospatial database management system (GDMS), mounted on a host vehicle, managing geospatial data relating to travel paths having one or more lanes, comprising:
    a geospatial database storing data elements indicative of objects and a location of the objects in three dimensional space, the objects having a lane-level resolution and the location having an accuracy of approximately one decimeter or less;
    a database manager component configured to maintain the data elements in the geospatial database and receive database queries from a driver assist subsystem configured to assist a driver of the host vehicle based on the data elements stored in the geospatial database;
    a query processor coupled to the database manager component and the geospatial database and configured to receive the database queries from the database manager component, query the geospatial database based on the database queries and return query results to the database manager component; and
    a radar filtering subsystem that blocks the passage of the location of selected objects, detected by the radar subsystem, to the driver assist subsystem.

* * * * *